Patented Nov. 4, 1941

2,261,188

UNITED STATES PATENT OFFICE 2,261,188

STABILIZED FORM OF VITAMIN B6 AND PROCESS OF PREPARING THE SAME

John V. Scudi, Astoria, Long Island, N. Y., assignor to Merck & Co., Inc., Rahway, N. J., a corporation of New Jersey No Drawing. Application November 6, 1940, Serial No. 364,597

10 Claims. (Cl. 260—297)

This invention relates to a stabilized form of vitamin $B_6$, and to a process of preparing the same.

Solutions of vitamin $B_6$ salts are very irritating when injected intramuscularly or subcutaneously, often causing necrosis at the site of injection. Neutral solutions of vitamin $B_6$ are unsuitable for such therapeutic use, because such neutral solutions (pH 7.0–7.5) are unstable to autoclaving, and in the usual sterilization procedures, undergo a loss of activity, and also, precipitation of an insoluble material occurs.

Heating a 10% neutral solution of vitamin $B_6$ at 125° C. and 20 lbs. pressure for 20 minutes causes the solution to become yellow in color, and precipitation of a relatively insoluble material takes place. Precipitation of an insoluble substance interferes seriously with the parenteral administration of such a solution. This insoluble material possesses considerably less activity than an equal weight of vitamin $B_6$ when tested by curative assay methods.

The insoluble material results from the autocondensation of two or more molecules of vitamin $B_6$. The rate at which the condensation product is formed varies with the vitamin concentration, the time of heating, and the temperature. For example, upon heating dilute solutions (1%), precipitation may not occur for several days, whereas upon autoclaving stronger solutions (10%), precipitation usually occurs within a few hours.

I have discovered that a neutral aqueous solution of vitamin $B_6$, which is stable to autoclaving, can be prepared by the addition of boric acid to an aqueous solution of a vitamin $B_6$ salt, with subsequent adjustment of the pH to about 7.0–7.5. Such solution remains colorless, and does not precipitate upon autoclaving. The stabilization of the vitamin solution results from the formation of a new borate complex having the following structure:

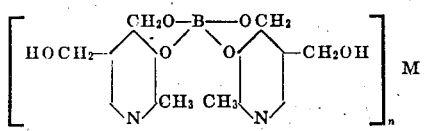

wherein M is a non-toxic metal, such as sodium, potassium, calcium, magnesium, aluminum, etc., and wherein $n$ is an integer equal in value to the valence of the metal.

This complex is formed in solution in the ratio of two molecules of the vitamin to one molecule of boric acid. When insufficient boric acid is present, not all of the vitamin is bound in the complex. In the presence of an excess of boric acid, the excess acid remains unbound. This is demonstrated by potentiometric titration of solutions containing the following proportions:

| Millimoles vitamin $B_6HCL$ | Millimoles boric acid | Calculated millimoles of complex | Millimoles of complex formed |
|---|---|---|---|
| 0.496 | 1.00 | 0.25 | 0.24 |
| 1.00 | 1.00 | 0.50 | 0.47 |
| 1.42 | 1.00 | 0.71 | 0.68 |
| 2.00 | 1.00 | 1.00 | 0.98 |
| 2.50 | 1.00 | 1.00 | 0.99 |

In all cases the vitamin is bound to boric acid in the ratio of two molecules to one, respectively.

This complex, when tested in the cure of rat acrodynia, shows activity equal to an equivalent weight of vitamin $B_6$, and is not irritating when administered intramuscularly.

Solutions of the vitamin-borate complex do not exhibit any local toxicity. No general toxicity can be noted, even when these solutions were fed to emaciated, deficient animals. In human beings, a therapeutic dose of vitamin $B_6$ HCl is estimated to be approximately 100 mg. Only 20–30 mg. of boric acid are required to stabilize this amount of vitamin. Since boric acid is administered therapeutically in doses of 300 to 1,000 mg., and since borates do not accumulate in the body, the vitamin $B_6$-borate complex appears to be eminently suitable for parenteral administration.

The new compound of the present invention may be obtained by dissolving 100 mg. of vitamin $B_6$ hydrochloride and 25 mg. of boric acid in water, and adjusting to a pH of about 7.0–7.5 by the dropwise addition of dilute sodium hydroxide. This solution can be used as such, for example, it can be autoclaved and then employed in injection, or the vitamin $B_6$-borate complex can be recovered from a concentrated solution, and may be crystallized from lower alcohols or water.

Other metals can be substituted for the sodium in the above complex, by employing metal hydroxides other than sodium hydroxide.

Modifications may be made in carrying out the present invention without departing from the spirit and scope thereof, and I am to be limited only by the appended claims.

I claim:
1. The compound of the formula:

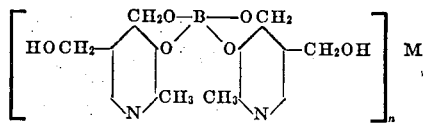

wherein M is a non-toxic metal, and wherein $n$ is an integer equal in value to the valence of the metal.

2. A substantially neutral aqueous solution of the compound of the formula:

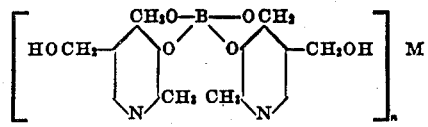 M wherein M is a non-toxic metal, and wherein n is an integer equal in value to the valence of the metal.

3. The compound of the formula:

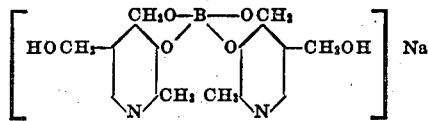 Na

4. The compound of the formula:

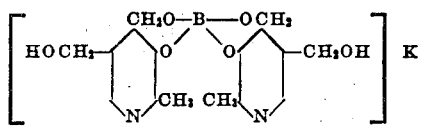 K

5. The compound of the formula:

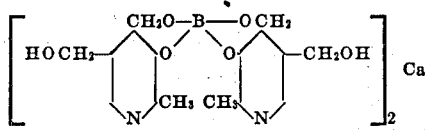 Ca

6. A substantially neutral aqueous solution of the compound of the formula:

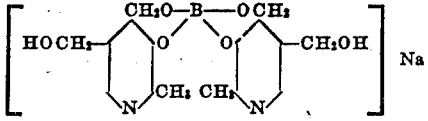 Na

7. A substantially neutral aqueous solution of the compound of the formula:

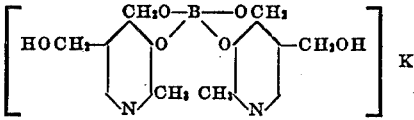 K

8. A substantially neutral aqueous solution of the compound of the formula:

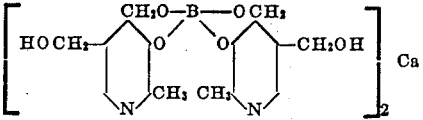 Ca

9. The process comprising dissolving a vitamin $B_6$ salt and boric acid in an aqueous medium, and subsequently adjusting the pH of the solution to about 7.0–7.5.

10. The process comprising dissolving a vitamin $B_6$ hydrochloride and boric acid in an aqueous medium, and subsequently adjusting the pH of the solution to about 7.0–7.5.

JOHN V. SCUDI.